United States Patent
Lepage et al.

(10) Patent No.: US 10,908,122 B2
(45) Date of Patent: Feb. 2, 2021

(54) TOTAL FOCUSING METHOD ADAPTIVELY CORRECTED BY USING PLANE WAVE

(71) Applicant: OLYMPUS AMERICA INC., Center Valley, PA (US)

(72) Inventors: Benoit Lepage, Quebec (CA); Guillaume Painchaud-April, Quebec (CA); Jason Habermehl, Quebec (CA)

(73) Assignee: Olympus America Inc., Center Valley, PA (US)

(*) Notice: Subject to any disclaimer, the term of this patent is extended or adjusted under 35 U.S.C. 154(b) by 837 days.

(21) Appl. No.: 15/472,603

(22) Filed: Mar. 29, 2017

(65) Prior Publication Data
US 2017/0284972 A1 Oct. 5, 2017

Related U.S. Application Data

(60) Provisional application No. 62/315,946, filed on Mar. 31, 2016.

(51) Int. Cl.
| | | |
|---|---|---|
| G01N 29/06 | (2006.01) | |
| G01N 29/26 | (2006.01) | |
| G01N 29/30 | (2006.01) | |
| G01N 29/04 | (2006.01) | |

(52) U.S. Cl.
CPC ......... *G01N 29/069* (2013.01); *G01N 29/043* (2013.01); *G01N 29/0645* (2013.01); *G01N 29/262* (2013.01); *G01N 29/30* (2013.01); *G01N 2291/267* (2013.01)

(58) Field of Classification Search
CPC ............... G01N 29/069; G01N 29/043; G01N 29/0645; G01N 29/30; G01N 29/262; G01N 2291/267
See application file for complete search history.

(56) References Cited

U.S. PATENT DOCUMENTS

| | | | | |
|---|---|---|---|---|
| 4,712,722 A | * | 12/1987 | Hood | B23K 9/0956 228/104 |
| 7,237,438 B1 | * | 7/2007 | Umbach | G01N 29/07 73/597 |
| 2007/0197916 A1 | * | 8/2007 | Kawagishi | A61B 8/06 600/459 |
| 2010/0212430 A1 | * | 8/2010 | Murai | G01N 29/221 73/620 |
| 2014/0200853 A1 | * | 7/2014 | Guan | G01N 29/069 702/189 |
| 2014/0219059 A1 | * | 8/2014 | Younghouse | G01S 7/52085 367/87 |
| 2014/0238136 A1 | * | 8/2014 | Ten Grotenhuis | G01N 29/0654 73/592 |
| 2016/0157828 A1 | * | 6/2016 | Sumi | G01N 29/262 702/189 |
| 2016/0258904 A1 | * | 9/2016 | Lozev | G01N 29/0654 |

\* cited by examiner

*Primary Examiner* — Randy W Gibson
*Assistant Examiner* — Gedeon M Kidanu
(74) *Attorney, Agent, or Firm* — Schwegman Lundberg & Woessner, P.A.

(57) ABSTRACT

Disclosed is a phased array ultrasound total focusing method in which the ultrasound energy is transmitted as plane waves and the response signals are processed as plane waves. The processing is adaptively corrected to account for geometric variations in the probes and the part being inspected. Methods are disclosed for measuring the geometric variations of the probes and the part.

23 Claims, 12 Drawing Sheets

TOTAL FOCUSING METHOD ADAPTIVELY CORRECTED BY USING PLANE WAVE

CROSS-REFERENCE TO RELATED APPLICATIONS

This application claims the benefit and priority of U.S. Provisional patent application Ser. No. 62/315,946 filed Mar. 31, 2016 entitled PLANE WAVE ADAPTIVELY CORRECTED TOTAL FOCUSING METHOD, the entire disclosure of which is incorporated herein by reference.

FIELD OF THE INVENTION

The invention relates to phased array ultrasonic (PAUT) non-destructive test and inspection (NDT/NDI), and more particularly to an improved Total Focusing Method (TFM) using plane waves, and with adaptive correction to account for irregularities in the component geometry.

BACKGROUND OF THE INVENTION

Full Matrix Capture (FMC) is a data-acquisition process in which each element of the PAUT probe is successively used as the transmitter, while all other elements are used as receivers. Having acquired a complete set of FMC data, TFM processing is performed to enable focal laws to be calculated for the entire set of acoustic paths from the emitter to the receiver, so that the emitted and received ultrasound energy may be focused at any desired location. For a PAUT inspection in which there are P transmitters and Q receivers an FMC data matrix of P×Q A-scans is required, resulting in long acquisition times, need for powerful and costly electronic processors, and large memory requirements. These problems become far worse for adaptive TFM, in which all the focal laws have to be recalculated to take into account positioning variations of the probe and part.

TFM equipment in existing practice often suffers from low inspection speed and high cost, even when the equipment is incapable of adapting to the component geometry.

Amplitude calibration is an additional problem in existing practice. Amplitude calibration refers to the requirement that a given flaw size should generate the same response signal amplitude no matter at what depth or angle the flaw is located. Amplitude calibration becomes more complex with the added requirement of adapting to component geometric variations.

Equipment in existing practice which is capable of full adaptive focusing with amplitude calibration is known to be slow and extremely expensive, with the requirements for electronic processing and memory being unacceptably high.

Thus there has been a need for fast and cost-effective equipment capable of performing fully adaptive TFM.

SUMMARY OF THE INVENTION

Accordingly, it is a general objective of the present disclosure to provide adaptive TFM equipment with increased speed, reduced cost and reduced computation requirements.

It is further an objective of the present disclosure to provide an accurate acoustic imaging of a weld, adaptively correcting for probe/part positioning variations, providing an imaging method adapted for the various shapes and orientations of flaws typically found in welds, and producing a calibrated amplitude representation which may be simply and rapidly implemented even when adaptively correcting the path.

It is further an objective of the present disclosure to improve the productivity of adaptive TFM by reducing the number of transmit/receive events required to complete the inspection.

It is further an objective of the present disclosure to reduce the cost of adaptive TFM by minimizing pulser voltage requirements, the amount of calculation and the size of the generated file.

The foregoing objectives are achieved by a method using plane wave TFM in which plane wave beams are employed in both transmission and reception.

The advantage of the plane wave TFM principle is that it allows reduction of the data and computation requirements by generating only the required wave angles to produce the desired inspection.

A further advantage of using plane waves is that amplitude calibration is greatly simplified because the refracted angle of a plane wave may be simply calculated from Snell's law. In addition, phase correction is possible when using plane waves.

A further advantage of using plane waves is that pulser voltage requirements are reduced because, unlike conventional FMC where a single element is pulsed at one time, many elements are simultaneously pulsed during plane wave generation, resulting in reduced voltage requirement for each element.

Use of plane waves only in transmission is known in existing practice in the field of medical ultrasound. Using plane waves in transmission may reduce the number of transmit/receive events, but the efficiency of the adaptive process is compromised by the complexity of forming the received beam. Using plane waves in reception as well as transmission further reduces the number of transmit/receive events and greatly reduces the complexity. The benefits of plane waves in reception are greatest when dealing with interfaces with large differences in refractive index, which is often the case in NDT/NDI, unlike in medical ultrasound where differences in refractive index are usually much smaller.

The foregoing objectives are further achieved by methods which automatically measure all variables pertaining to the positioning variations of the probe and part.

DETAILED DESCRIPTION OF PREFERRED EMBODIMENT

Schematic Representation of the Method

Figure 1A:
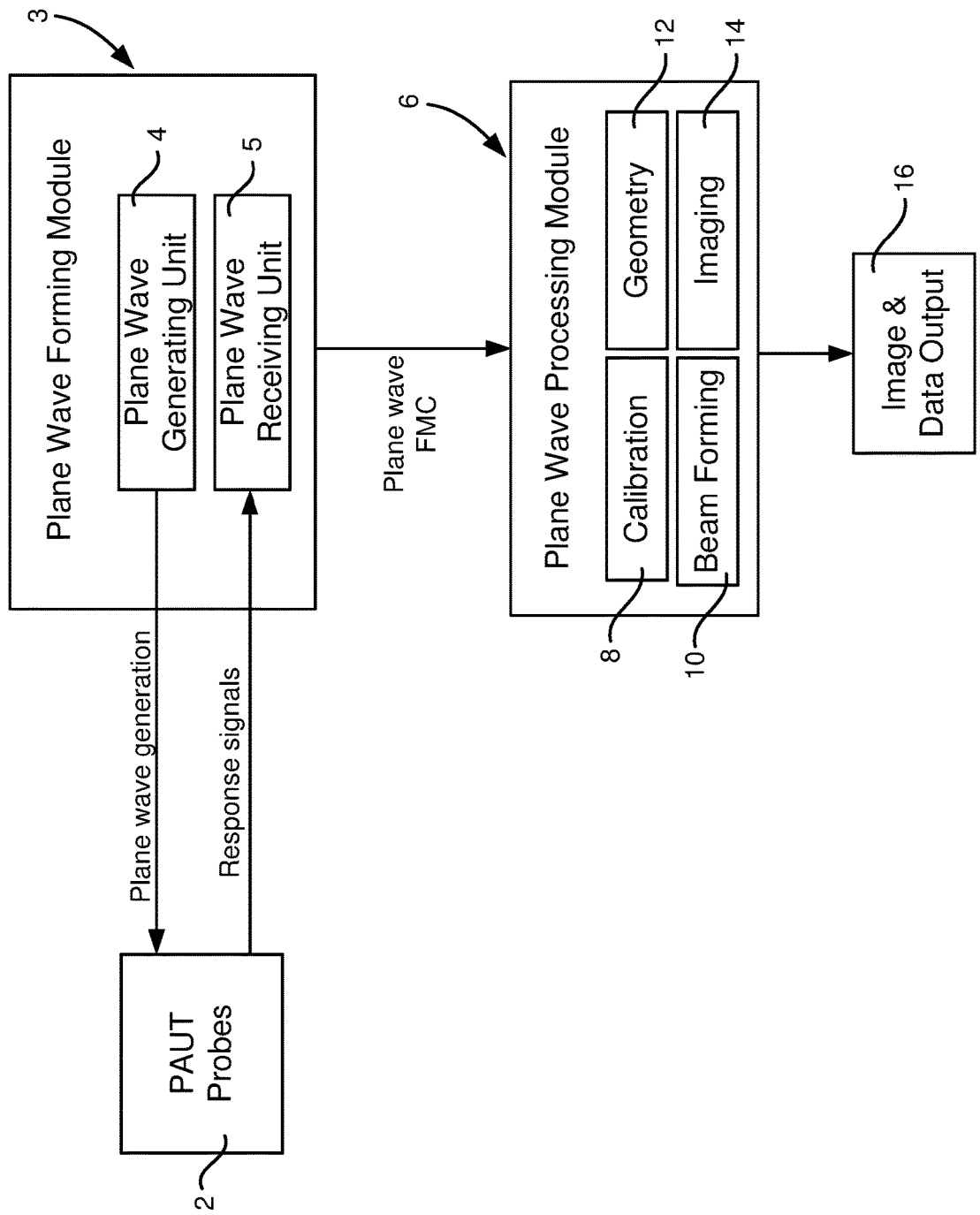
FIG. 1A is a schematic of a plane wave adaptive TFM system according to the present disclosure.

FIG. 1A is a schematic of a plane wave adaptive TFM system according to the present disclosure. One or more PAUT probes 2 are pulsed to transmit plane waves by means of a plane wave generation signal sent from a plane wave forming module 3, comprising a plane wave generation unit 4 and a plane wave receiving unit 5. Response signals received by PAUT probes 2 are sent to plane wave receiving unit 5, and the response signals are processed by plane wave forming module 3 to form a plane wave FMC data matrix in which the response signals are treated as a set of plane waves having various angles of inclination to the receiving probe array. The plane wave FMC data matrix is transferred to a plane wave processing module 6, which comprises a calibration module 8, a beam forming module 10, a geometry module 12 and an imaging module 14. The output from plane wave processing module 6 is images and data representative of the flaws in a test object.

Figure 1B:
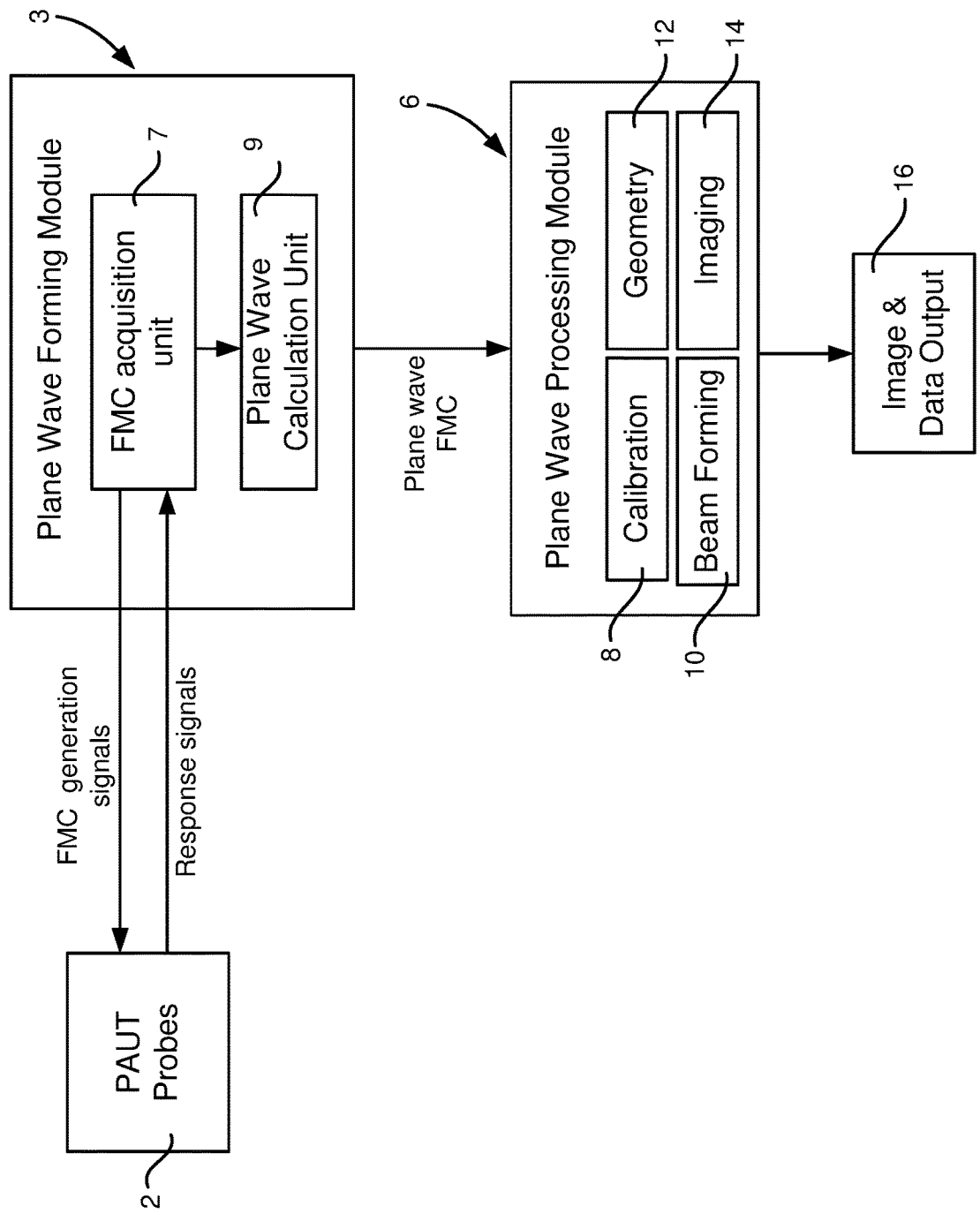
FIG. 1B is a schematic of an alternative embodiment of a plane wave adaptive TFM system according to the present disclosure.

In order to reduce acquisition time, use of plane wave forming module 3 comprising plane wave generating unit 4 to cause plane wave generation by probes 2 is the preferred mode. However, FIG. 1B illustrates an alternative embodiment in which the plane wave FMC matrix is derived by post-processing of a conventional FMC matrix. In the embodiment of FIG. 1B, plane wave forming module 3 comprises a FMC acquisition unit 7 and a plane wave calculation unit 9. FMC acquisition unit 7 is configured to successively pulse each of P transmitters in PAUT probes 2, and to receive response signals at each of Q receivers in probes 2, thereby acquiring a conventional P×Q FMC matrix. Plane wave calculation unit 9 is configured to derive the plane wave FMC matrix by post-processing calculations performed on the conventional FMC matrix.

Note that such post-processing of a conventional FMC matrix to produce a plane wave FMC matrix is within the scope of the present disclosure. Moreover, all aspects of the present invention, including the descriptions in relation to FIGS. 1~11, and in relation to equations (1)~(27), apply both to generation of plane waves by plane wave generation unit 4, and to generation of a conventional FMC matrix by FMC acquisition unit 7 followed by post processing of the conventional FMC matrix by plane wave calculation unit 9 to produce a plane wave FMC matrix.

Figure 2:
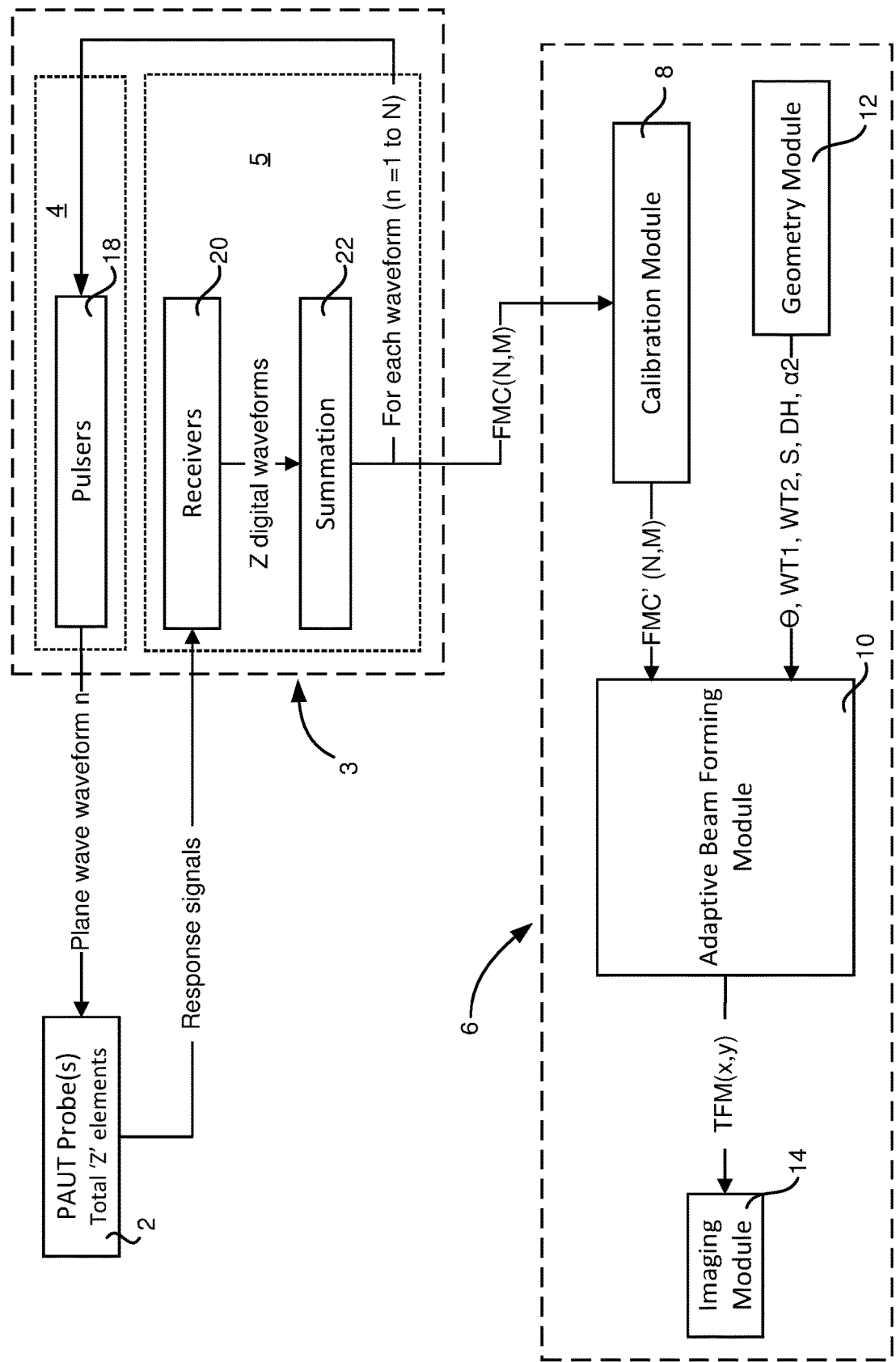
FIG. 2 is a more detailed schematic of a plane wave adaptive TFM system according to the present disclosure.

FIG. 2 is, a more detailed schematic of a plane wave adaptive TFM system according to the present disclosure. Plane wave generation unit 4 comprises a multiplicity of pulsers 18, and plane wave receiving unit 5 comprises a multiplicity of receivers 20 and a summation unit 22. Pulsers 18 transmit an $n^{th}$ plane wave waveform to PAUT probes 2, where n takes values from 1 to N, N is the total number of transmitted plane waves, and each plane wave has an angle of inclination $\beta_n$. PAUT probes 2 have a combined total of Z elements, and the response signals from all elements are received by receivers 20, which send the received signals from the $n^{th}$ plane wave to a summation unit 22 in the form of a number Z of digital waveforms ("A-scans"). Summation unit 22 sums the Z waveforms and converts the result into an equivalent summation of M received plane waves, each received plane wave having an angle of inclination $\beta_m$. The process is repeated for transmitted plane waves 1 to N, which is a set of plane waves with different angles required for insonification of the volume being inspected. Delays for the $n^{th}$ plane wave emission and the $m^{th}$ plane wave reception are set according to the target angles $\beta_n$ and $\beta_m$ as described in connection with Table 1 below. The end result is a complete FMC matrix FMC(N, M) corresponding to N transmitted plane waves and M received plane waves, which is passed from plane wave acquisition unit 4 to plane wave processing module 6.

Plane wave processing module 6, comprises calibration module 8, beam forming module 10, geometry module 12 and imaging module 14. As described in connection with Tables 2 and 3 below, calibration module 8 converts matrix FMC(N, M) into one or more matrices FMC'(N, M), which are calibrated such that a given flaw size generates the same response signal amplitude within the FMC' matrix no matter at what depth or angle the flaw is located. Calibrated matrix FMC'(N, M) is passed to beam forming module 10. As described in connection with FIGS. 7A and 7B below, geometry module 12 determines the geometric parameters of the weld being inspected and supplies those parameters to beam forming module 10. The function of beam forming module 10 is to convert the matrix FMC'(N, M), which represents uniform transmission and reception of plane waves covering the entire volume under inspection, into a TFM matrix, TFM(x,y), in which the A-scans are summed with correct time-of-flight delays in both transmission and reception in order to produce constructive interference at each of the voxels (x,y). The conversion process carried out by beam forming module 10 is referred to hereinafter as "plane wave TFM beam forming". The TFM matrix from beam forming module 10 is passed to imaging module 14 which creates an image of flaws in the part being inspected.

Note that the term "voxel" is used herein to denote an arbitrary smallest volume imaging element within the imaging volume. The term "voxel" for a 3D image is analogous to the term "pixel" as used for a 2D image.

Note also that, in order to produce a full image of the test object, PAUT probes 2 are usually mechanically scanned in a scan direction, and the imaging volume at each scan position comprises a multiplicity of adjacent voxels substantially in a plane perpendicular to the scan direction.

General Principles of the Method

The inventive method takes full advantage of the plane wave TFM beam forming principle and adapts it to the inspection requirements by generating only the required wave angles to produce the desired inspection, thus minimizing the number of transmit/receive events required to complete the inspection. The required wave angles are defined as the range of plane waye inclination angles which allows insonification of all voxels within the inspection volume using the full probe aperture. The definition of required wave angles should apply to all inspection schemes such as pulse-echo (PE), pitch-catch, tandem, and time of flight diffraction (TOFD).

Figure 3:
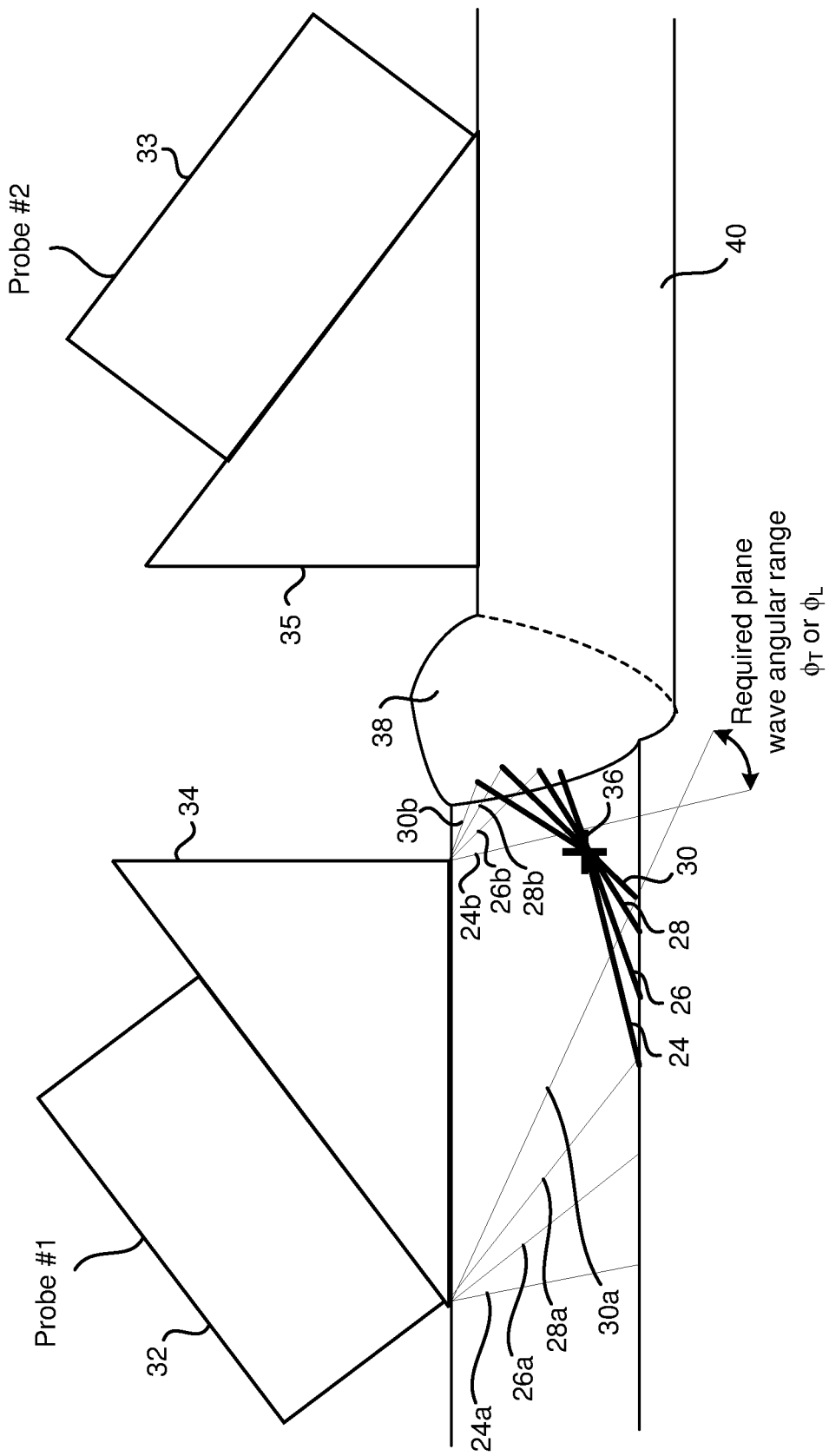
FIG. 3 is a schematic illustration of the method of using transmitted plane waves to achieve a focus.
Figure 4:
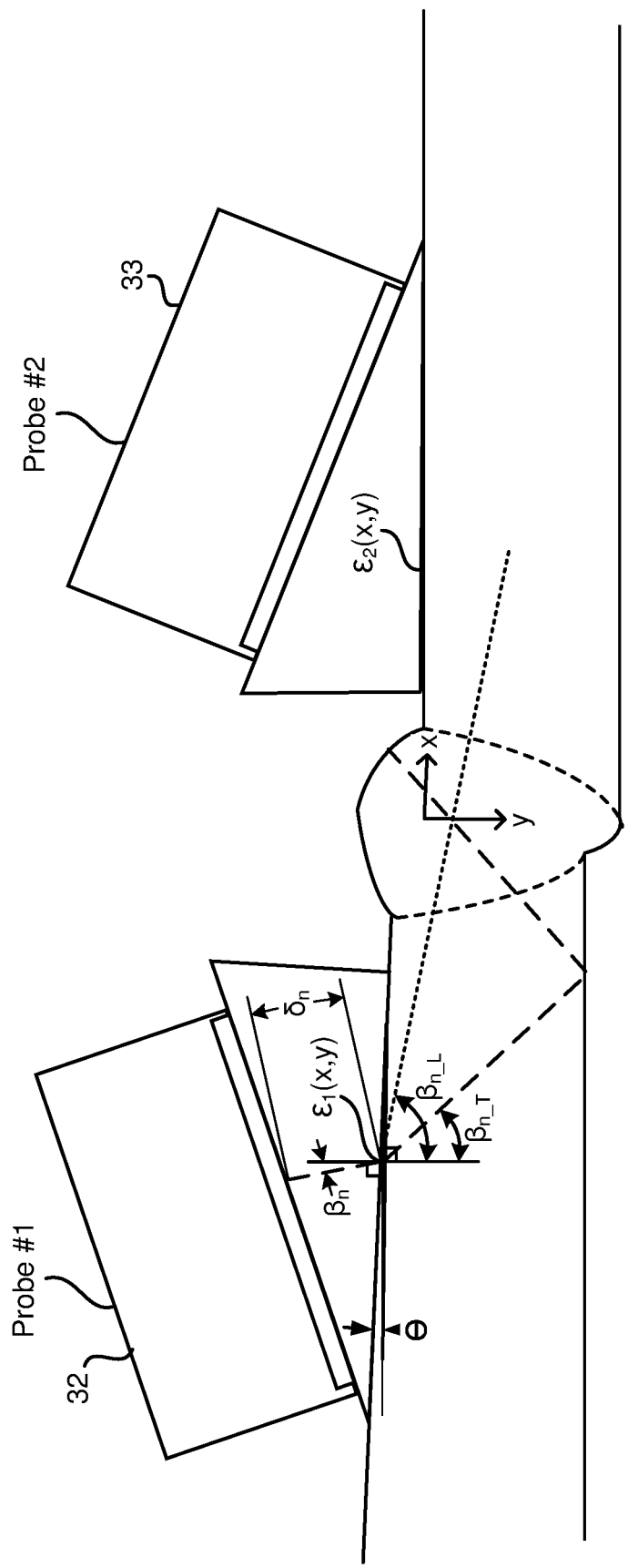
FIG. 4 is an illustration of the symbols and conventions used in the present disclosure.

FIG. 3 illustrates the principle of plane waves in transmission, in which the goal is to focus ultrasonic energy on a target focalization voxel 36 within a test object 40. Conventionally, the ultrasound would be focused by directing energy from each of the elements of a probe 32 through a wedge 34 towards target voxel 36, thereby forming a focused ultrasonic beam. As shown in FIG. 3, equivalent focusing may be achieved by sequentially generating plane waves, in which all elements of probe 32 participate in generation of each plane wave, and the plane wave-fronts have a required angular range $\phi_T$ (for shear waves) and $\phi_L$ (for longitudinal waves) as shown. FIG. 3 illustrates plane wave-fronts 24, 26, 28, 30 having extremities 24a, 24b, 26a, 26b, 28a, 28b, 30a and 30b respectively, converging on target voxel 36. Although FIG. 3 illustrates plane waves in transmission, by the well-known principle of reciprocity in ultrasound, ultrasonic energy emanating from a voxel may be considered to be comprised of a superposition of plane waves, and the receivers may be configured to receive all the ultrasound response signals as superposed plane waves.

As shown in FIG. 3 there may be two probes, a probe #1 32 and a probe #2 33, with corresponding wedges 34 and 35, located on either side of a weld 38 which is to be inspected. In an embodiment, wedges 34 and 35 are made of Rexolite plastic material. It should be noted that for some inspection modes involving two probes, such as TOFD TFM, probe 32 may generate a larger range of angles than probe 33, and probe 33 may receive a larger range of angles than probe 32, or, conversely, probe 33 may generate a larger range of angles than probe 32, and probe 32 may receive a larger range of angles than probe 33.

It is an objective of the present disclosure to produce an inspection result which dynamically adapts to geometric variations of the probes and the test object. Typically, with existing FMC/TFM processes, that would mean recalculating the time of flight (TOF) from each of the probe elements to the target voxel. Such a process requires a huge amount of processing as it typically involves use of the Fermat principle to iteratively find the shortest possible acoustic path from each element to each of the voxels.

However, using plane waves, it is very easy and fast to find the TOF to a particular voxel since this TOF is the same for all positions along the plane wave and also because the angle of the wave is precisely given by Snell's law. Therefore, it is possible to directly find the delay to any voxel for any plane wave using a simple and fast computation. Accordingly, using plane waves for both transmission and reception provides major simplification in the adaptive re-calculation of focal laws.

Overview of the System and Method

The method is based on the use of plane waves for transmission and reception of the acoustic signals in the test object. The method is restricted to planar surfaces within the test object, but multiple surfaces may be inclined relative to one another with an angle θ (see FIG. 4).

According to the method, a total of N plane waves at angles of inclination $\beta_n$ are generated in transmission, some of which are generated by probe #1 and some by probe #2. A total of M plane waves are generated in reception through plane wave TFM beam forming, in which the acquisition unit receives M plane waves at different angles $\beta_m$ for each of the N transmitted plane waves. A Full Matrix Capture matrix, FMC(N, M), includes all the required information of the N generated plane waves. Ideally, the N and M plane waves are defined so that:

a. The plane waves provide the required angular range $\phi_T$ (for transverse/shear waves) and $\phi_L$ (for longitudinal waves) for computing all required inspection modes, where the inspection modes are defined as the different paths from the emitter to the voxel to the receiver (see FIGS. 5A and 5B).

b. The number N of generated plane waves is minimized.

c. There is orthogonal side lobe positioning between transmitted waves N and received waves M. Side lobes in the summed plane waves are artefacts due to incomplete summation. Orthogonal side lobe positioning means that lobes occurring in transmission do not also occur in reception.

The FMC Matrix may include one or multiple probes, but each of the N emitted plane waves is emitted by one probe only, and each of the M received plane waves is received by one probe only. Table 1 is an example of the matrix FMC(N, M) for a two probe configuration. The two probe configuration is an embodiment of the invention which is used for all further descriptions and calculations below. However, other probe configurations are possible and all are within the scope of the present disclosure.

TABLE 1

| | | | | | Received plane wave "m". | | | | | | | | | | | | | |
|---|---|---|---|---|---|---|---|---|---|---|---|---|---|---|---|---|---|---|
| | | | | | | | | | | ID | | | | | | | | |
| | | | | 1 | 2 | 3 | 4 | 5 | 6 | 7 | 8 | 9 | 10 | 11 | 12 | 13 | 14 | 15 |
| | | | | | | | | | | | angle β | | | | | | | |
| | | | | 30.9 | 36.5 | 41.1 | 44.5 | 46.3 | 30.9 | 36.5 | 41.1 | 44.5 | 46.3 | 16.6 | 19.4 | 21.5 | 23.0 | 23.8 |
| | | | | | | | | | | | Probe | | | | | | | |
| | | | | 1 | 1 | 1 | 1 | 1 | 2 | 2 | 2 | 2 | 2 | 2 | 2 | 2 | 2 | 2 |
| Transmitted plane wave "n" | 1 | 31.6 | 1 | $AS_{1,1}$ | $AS_{1,2}$ | (...) | (...) | (...) | (...) | (...) | (...) | (...) | (...) | N/A | N/A | N/A | N/A | N/A |
| | 2 | 38.3 | 1 | $AS_{2,1}$ | $AS_{2,2}$ | (...) | (...) | (...) | (...) | (...) | (...) | (...) | (...) | N/A | N/A | N/A | N/A | N/A |
| | 3 | 43.4 | 1 | $AS_{3,1}$ | $AS_{3,2}$ | (...) | (...) | (...) | (...) | (...) | (...) | (...) | (...) | N/A | N/A | N/A | N/A | N/A |
| | 4 | 46.1 | 1 | (...) | (...) | (...) | (...) | (...) | (...) | (...) | (...) | (...) | (...) | N/A | N/A | N/A | N/A | N/A |
| | 5 | 17.6 | 1 | N/A | N/A | N/A | N/A | N/A | N/A | N/A | N/A | N/A | N/A | (...) | (...) | (...) | (...) | (...) |
| | 6 | 21.5 | 1 | N/A | N/A | N/A | N/A | N/A | N/A | N/A | N/A | N/A | N/A | (...) | (...) | (...) | (...) | (...) |
| | 7 | 23.6 | 1 | N/A | N/A | N/A | N/A | N/A | N/A | N/A | N/A | N/A | N/A | (...) | (...) | (...) | (...) | (...) |
| | 8 | 31.6 | 2 | (...) | (...) | (...) | (...) | (...) | (...) | (...) | (...) | (...) | (...) | N/A | N/A | N/A | N/A | N/A |
| | 9 | 38.3 | 2 | (...) | (...) | (...) | (...) | (...) | (...) | (...) | (...) | (...) | (...) | N/A | N/A | N/A | N/A | N/A |

TABLE 1-continued

Received plane wave "m".

| | | | | | | | | ID | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | | | | | | | | angle β | | | | | | | |
| | 30.9 | 36.5 | 41.1 | 44.5 | 46.3 | 30.9 | 36.5 | 41.1 | 44.5 | 46.3 | 16.6 | 19.4 | 21.5 | 23.0 | 23.8 |
| | | | | | | | | Probe | | | | | | | |
| | 1 | 1 | 1 | 1 | 1 | 2 | 2 | 2 | 2 | 2 | 2 | 2 | 2 | 2 | 2 |
| 10 43.4 2 | (...) | (...) | (...) | (...) | (...) | (...) | (...) | (...) | (...) | (...) | N/A | N/A | N/A | N/A | N/A |
| 11 46.1 2 | (...) | (...) | (...) | (...) | (...) | (...) | (...) | (...) | (...) | (...) | N/A | N/A | N/A | N/A | N/A |

Table 1 is an example of a two-probe plane wave FMC(N, M) matrix in which N=11 and M=15. Cells designated "$AS_{n,m}$" contain A-scan data (response signal vs time) for the $n^{th}$ transmitted wave and the $m^{th}$ received wave. Cells designated "( . . . )" are equivalent to cells designated "$AS_{n,m}$", being labeled as such for purposes of compact presentation.

Note that-transmitted waves n=1 to 4 and n=8 to 11 are shear waves, and transmitted waves n=5 to 7 are longitudinal waves. Received waves m=1 to 11 are shear waves, and received waves m=11 to 15 are longitudinal waves. Cells designated "N/A" correspond to those A-scans that are not acquired because the transmitted and received waves do not correspond to the same propagation mode. This means that A-scans are only acquired if the transmitted and received waves are both shear, or the transmitted and received waves are both longitudinal.

Note also that the matrix in Table 1 includes more transmission with probe #1 and more reception with probe #2. This is because the matrix in Table 1 is configured for the longitudinal wave P1L/P2L and P1LL/P2LL modes (see below for definition of the nomenclature) with P1 as transmit and P2 as receive. Other configurations of transmission and reception are possible and all are within the scope of the present invention.

Nomenclature and Conventions

In the description below, the following conventions are applied (see FIG. 4):
$\beta_n$ refers to the $n^{th}$ plane wave generated by the probe. The angle $\beta_n$ is referenced to the normal of the wedge face in contact with the part.
$\beta_m$ refers to the $m^{th}$ plane wave received by the probe. The angle $\beta_m$ is referenced to the normal of the wedge face in contact with the part.
In the description below, $\beta_n$ will be used for most calculations and figures, but it must be understood that by reciprocity all calculations and figures also apply to $\beta_m$.
Initial delays $\delta_n$ and $\delta_m$ are applied to set the origin of the plane waves at $\varepsilon_1$ and $\varepsilon_2$ for the first and second probe respectively. The nominal distance between $\varepsilon_1$ and $\varepsilon_2$ is set to be S' (see FIG. 7B).
$\beta_{n\_T}$ and $\beta_{m\_T}$ refer to shear waves whose angle is referenced to the normal of the wedge face in contact with the part. Angles $\beta_{n\_T}$ and $\beta_{m\_T}$ are directly provided by the application of Snell's law to $\beta_n$ and $\beta_m$.
$\beta_{n\_L}$ and $\beta_{m\_L}$ refer to longitudinal waves whose angle is referenced to the normal of the wedge face in contact with the part. Angles $\beta_{n\_L}$ and $\beta_{m\_L}$ are directly provided by the application of Snell's law to $\beta_n$ and $\beta_m$.
Waves n=1 to N' are transmitted by probe #1, and waves m=1 to M' are received by probe #1, whereas waves n=(N'+1) to N are transmitted by probe #2, and waves m=(M'+1) to M are received by probe #2.
$C_L$ refers to the longitudinal wave sound velocity in the test object.
$C_S$ refers to the shear wave sound velocity in the test object.

Figure 5A:
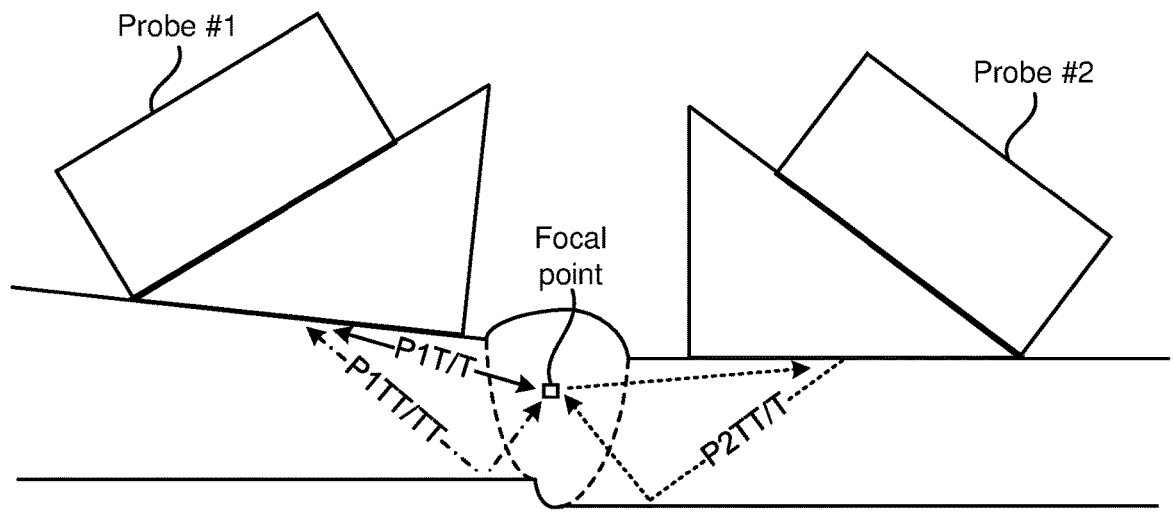
FIG. 5A is an illustration of imaging modes and their nomenclature.
Figure 5B:
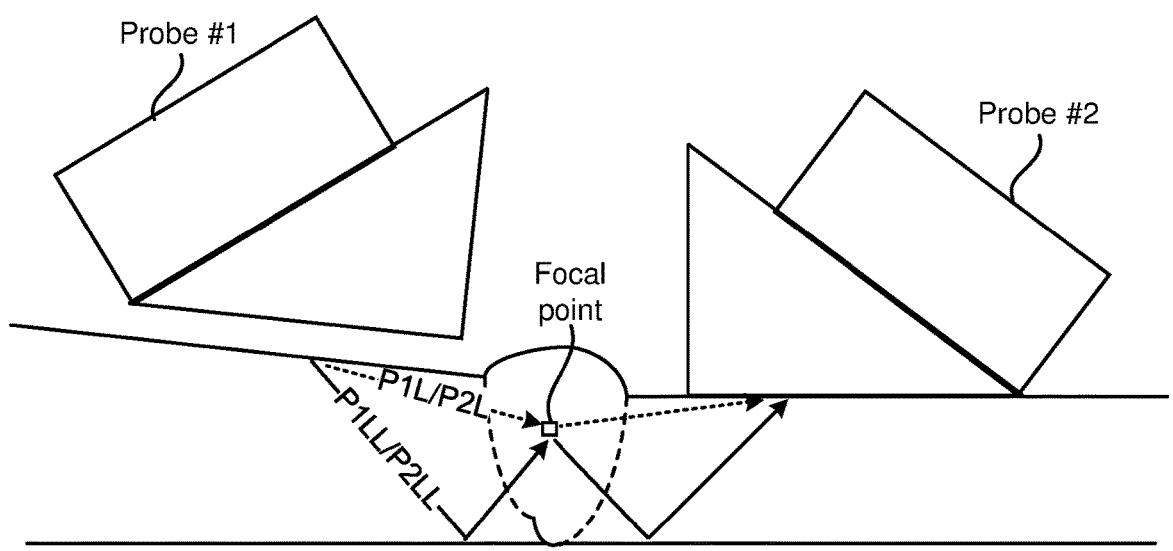
FIG. 5B is a further illustration of imaging modes and their nomenclature.

Multiple imaging modes are covered by this disclosure, and FIGS. 5A and 5B illustrate the nomenclature which has been adopted to describe these modes. In the adopted nomenclature, symbols before "/" are for transmission, symbols after "/" are for reception, P1 or P2 refers to transmission or reception by probe #1 or probe #2 respectively, T refers to a shear wave without skip, TT a shear wave with skip, L refers to a longitudinal wave without skip, and LL a longitudinal wave with skip. Although other modes may be conceived and all are within the scope of the present disclosure, specific modes include the following:

P1T/T—Pulse Echo inspection prior to first skip using shear wave with probe #1. (Shown in FIG. 5A).
P2T/T—Pulse Echo inspection prior to first skip using shear wave with probe #2. (Not shown).
P1TT/T—Self tandem inspection using shear wave with probe #1. (Not shown).
P2TT/T—Self tandem inspection using shear wave with probe #2. (Shown in FIG. 5A)
P1TT/TT—Pulse Echo inspection after first skip using shear wave with probe #1. (Shown in FIG. 5A)
P2TT/TT—Pulse Echo inspection after first skip using shear wave with probe #2. (Not shown).
P1L/P2L—Pitch catch inspection using longitudinal wave from probe #1 to probe #2 without skip on the back wall. (Shown in FIG. 5B).
P1LL/P2LL—Pitch catch inspection using longitudinal wave from probe #1 to probe #2 with skip on the back wall. (Shown in FIG. 5B).

Calibration Module

This section details the processes included in calibration module 8. The objective of this step is to obtain a uniform insonification of the test object with each plane wave and each depth. Compensation algorithms are applied directly to the FMC Matrix to produce a calibrated FMC' Matrix. This process can either be done in the acquisition unit during acquisition of the FMC matrix or it can be implemented later in post-processing.

Two separate FMC' matrices are produced, one for shear waves and one for longitudinal waves, with only relevant waves being included in each respective matrix.

One advantage associated with the use of plane waves is that the amount of transmitted energy, as well as the phase information, is known for each of the waves. This is because exact analytic calculations of plane wave transmission and reflection coefficients are known in the art, are applicable to any material and provide unique solutions. It should be noted that an analytical solution with conventional beams and typical single element based FMC is not available in existing practice because those situations involve-multiple angles combined in the same measurement.

Figure 6A:
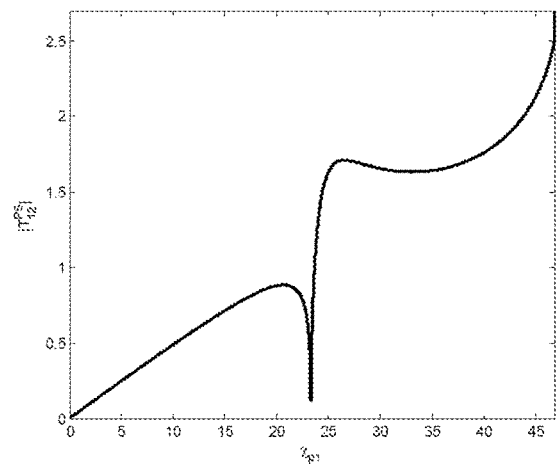
FIG. 6A is a graph of transmission coefficients vs angle of incidence for plane shear waves crossing an interface from Rexolite to carbon steel.
Figure 6B:
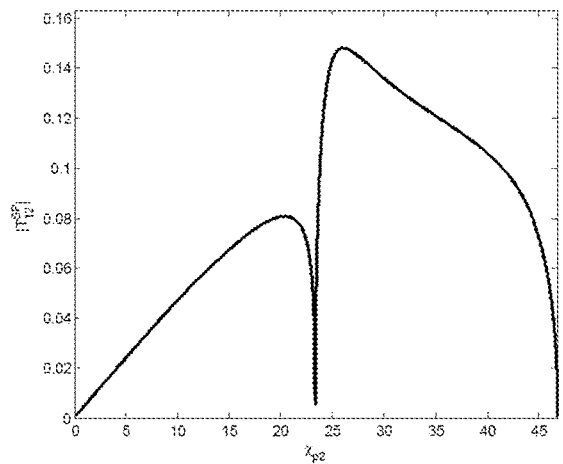
FIG. 6B is a graph of transmission coefficients vs angle of incidence for plane shear waves crossing an interface from carbon steel to Rexolite.
Figure 6C:
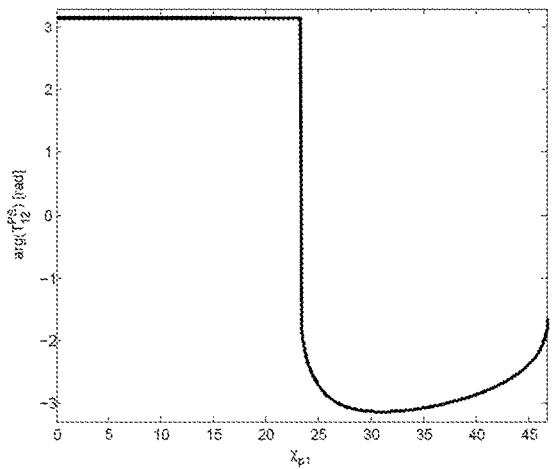
FIG. 6C is a graph of phase lag vs angle of incidence for plane shear waves crossing an interface from Rexolite to steel.

FIGS. 6A, 6B and 6C show examples of plane wave analytical calculations. FIG. 6A is a graph of transmission coefficient for the acoustic potential amplitude vs angle of incidence for plane shear waves crossing an interface from Rexolite to carbon steel. FIG. 6B is a graph of transmission coefficient vs angle of incidence for plane shear waves crossing an interface from carbon steel to Rexolite. FIG. 6C is a graph of phase lag vs angle for plane shear waves crossing an interface from Rexolite to steel.

Making use of calculations such as those shown in FIGS. 6A, 6B and 6C, it is possible to compensate directly each of the combinations in the FMC(N, M) dataset for transmission loss and phase lag. Therefore, each of the $AS_{n,m}$ elements in Table 1 is phase shifted and normalized in amplitude in order to remove the effect of the Rexolite to steel interface for the whole acoustic path.

Another compensation that must be applied accounts for the uneven distribution of ultrasonic energy as a function of angle relative to an individual probe element. Typically, since each probe element is only an approximation of a point source and does have a finite (known) width, each element will generate maximum pressure normal to the element surface and the pressure will decrease for increasing angles of emission relative to this normal. The exact angular emission profile can be found using commercially available simulation tools (such as CIVA from Extende).

Yet another compensation to apply is to take account of attenuation of the signal through the inspected material. This attenuation includes a geometric attenuation due to the beam spreading out as it progresses through the material, and a metallurgical attenuation due to the diffusion and/or absorption of the acoustic energy as the beam progresses through the inspected component. Whereas the geometrical attenuation can be predicted using commercially available simulation tools, the metallurgical attenuation must be derived experimentally, knowing that it is typically an exponential decrease of beam intensity with distance.

After application of the corrections described above, two calibrated FMC' matrices are produced: one for shear waves and one for longitudinal waves. Table 2 shows the $FMC'_T$ data matrix for shear waves with calibrated A-scans, $AS_T'$, and Table 3 shows the $FMC'_L$ data matrix for longitudinal waves with calibrated A-scans, $AS_L'$. As described above, A-scans $AS_T'$ and $AS_L'$ are calibrated (i) for amplitude loss and phase shift at the interface, (ii) for angular distribution of the ultrasonic energy and (iii) for signal attenuation within the inspected material.

TABLE 2

| | | | | | Received plane wave "m" | | | | | | | | |
|---|---|---|---|---|---|---|---|---|---|---|---|---|---|
| | | | | | | | | ID | | | | | |
| | | | | | 1 | 2 | 3 | 4 | 5 | 6 | 7 | 8 | 9 | 10 |
| | | | | | | | | | angle $\beta_T$ | | | | | |
| | | | | | 45.0 | 55.0 | 65.0 | 75.0 | 85.0 | 45.0 | 55.0 | 65.0 | 75.0 | 85.0 |
| | | | | | | | | | Probe | | | | | |
| | | | | | 1 | 1 | 1 | 1 | 1 | 2 | 2 | 2 | 2 | 2 |
| Transmitted plane wave "n" | 1 | 46.3 | 1 | $AS_{T'1,1}$ | $AS_{T'1,2}$ | (...) | (...) | (...) | (...) | (...) | (...) | (...) | (...) |
| | 2 | 58.8 | 1 | $AS_{T'2,1}$ | $AS_{T'2,2}$ | (...) | (...) | (...) | (...) | (...) | (...) | (...) | (...) |
| | 3 | 71.3 | 1 | $AS_{T'3,1}$ | $AS_{T'3,2}$ | (...) | (...) | (...) | (...) | (...) | (...) | (...) | (...) |
| | 4 | 83.8 | 1 | (...) | (...) | (...) | (...) | (...) | (...) | (...) | (...) | (...) | (...) |
| | 5 | 46.3 | 1 | (...) | (...) | (...) | (...) | (...) | (...) | (...) | (...) | (...) | (...) |
| | 6 | 58.8 | 1 | (...) | (...) | (...) | (...) | (...) | (...) | (...) | (...) | (...) | (...) |
| | 7 | 71.3 | 1 | (...) | (...) | (...) | (...) | (...) | (...) | (...) | (...) | (...) | (...) |
| | 8 | 83.8 | 2 | (...) | (...) | (...) | (...) | (...) | (...) | (...) | (...) | (...) | (...) |

TABLE 3

| | | | | | ID | | | | |
|---|---|---|---|---|---|---|---|---|---|
| | | | | | 1 | 2 | 3 | 4 | 5 |
| | | | | | | | angle $\beta_L$ | | |
| | | | | | 45.0 | 55.0 | 65.0 | 75.0 | 85.0 |
| | | | | | | | Probe | | |
| | | | | | 2 | 2 | 2 | 2 | 2 |
| Transmitted plane wave "n" | 1 | 48.3 | 1 | $AS_{L'1,1}$ | $AS_{L'1,2}$ | (...) | (...) | (...) |
| | 2 | 65.0 | 1 | $AS_{L'2,1}$ | $AS_{L'2,2}$ | (...) | (...) | (...) |
| | 3 | 81.7 | 1 | $AS_{L'3,1}$ | $AS_{L'3,2}$ | (...) | (...) | (...) |

Geometry Module

Various methods can be conceived by which geometry module 12 provides measurements of the part geometry and probe arrangement. One embodiment is described below, but it should be understood that many alternative methods may be conceived by those skilled in the art, and all are within the scope of the present disclosure.

In the discussion below, the following assumptions are made, all of which are reasonable for commonly encountered NDT/NDI applications:

Probe contact surfaces are planar along the probe active length

The front wall surfaces under Probe #1 and Probe #2 are offset from one another by an angle θ.

Two configurations are possible for the back walls, and both are within the scope of the present disclosure:

CASE #1: The back walls under Probe #1 and Probe #2 are each parallel to their respective front walls, and are therefore offset from one another by angle θ. This situation corresponds to a piping weld with imperfect alignment.

CASE #2 (preferred embodiment for this disclosure): The back walls under Probe #1 and Probe #2 are parallel to each other (corresponding to flange weld configurations), even though the front wall under probe #1 is inclined at angle θ to the front wall under probe #2.

Figure 7A:
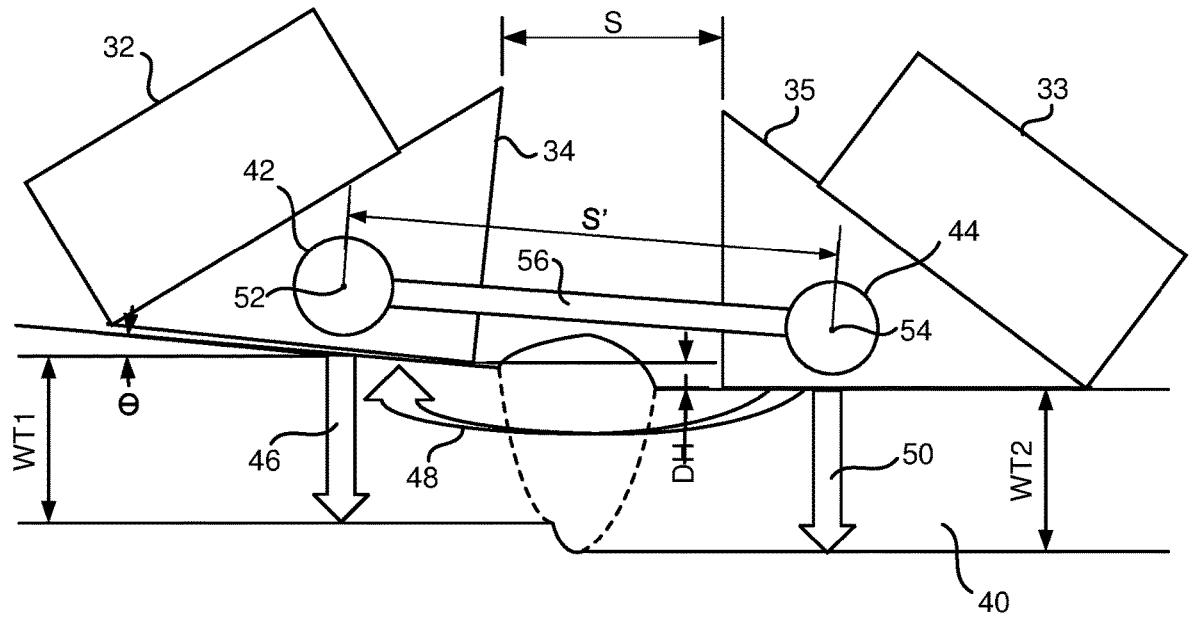
FIG. 7A is a diagram showing the geometry of the part and probe, and methods of measuring the geometry.
Figure 7B:
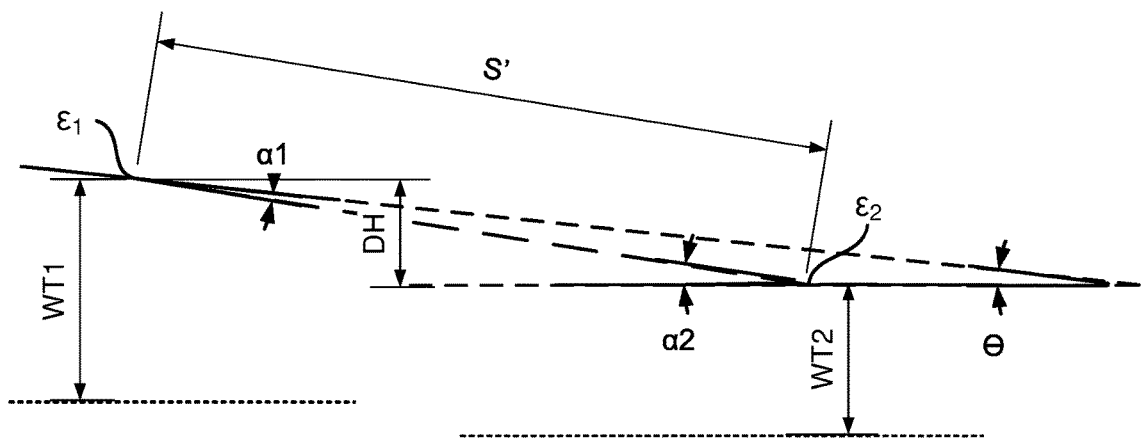
FIG. 7B is a schematic illustration showing details of the geometry measurements.

FIG. 7A illustrates the geometry of probes 32, 33 and wedges 34, 35, and of test object 40. FIG. 7B is a schematic illustration of the parameters to be measured. Geometry module 12 is required to measure the parameters shown in FIGS. 7A and 7B, namely WT1, WT2, S, and θ.

Measurement of wall thicknesses WT1 and WT2 may be achieved using PAUT beams 46 and 50 which are relatively perpendicular to the back wall. Using such PAUT beams as a thickness gauge is a process which is well known in the art. The thickness measurement reference is made at pivot positions 52 and 54 of rotary encoders 42 and 44 respectively, and the exit points of beams 46 and 50 are below pivot positions 52 and 54 respectively, corresponding to positions $\varepsilon_1$ and $\varepsilon_2$ shown in FIG. 7B.

Measurement of probe separation S may be achieved using a PAUT beam 48 which is generated by one probe and received by the other. In the embodiment shown in FIG. 7A, beam 48 is generated by probe 33 and received by probe 32. Beam 48 is steered by probe 33 to be a longitudinal wave at the critical angle, which maximizes the portion of the wave travelling under the surface. The distance between the probes may be determined from the equation $$S = c_L(T_{total} - T_{delay}) \quad (1)$$

where $c_L$ is the longitudinal wave velocity in part 40, $T_{total}$ is the total time between generation and reception of beam 48, and $T_{delay}$ is the wedge delay measured when wedges 34 and 35 are back to back in direct contact. Note that this measurement could be avoided by using a rigid link 56 between the probes with known length S', provided the pivot points 52 and 54 are close enough to part 40 to avoid significant changes of S' when angle θ changes.

Measurement of angle of inclination θ and displacement DH may be achieved by means of rotary encoders 52 and 54 connected by rigid link 56. If the angles measured by rotary encoders 52 and 54 are α1 and α2 respectively, then angle of inclination θ is given by:

$$\theta = \alpha 2 - \alpha 1 \quad (2)$$

Displacement DH is measured between pivots 52 and 54 and is given by:

$$DH = \frac{S'(\sin \alpha_2)}{2} \quad (3)$$

In an alternative embodiment of geometry module 12, parameters θ, S' and DH may be measured by an external optical imaging system such as a camera, in which case encoders 52 and 54 and rigid link 56 would not be required.

Beam Forming Module

As a first step in the description of the function of the beam forming module, the basic concept of the FMC(M,N) plane wave matrix summation will be applied to calculation of a PE shear wave with no back wall skip. Such a wave is designated P1T/T or P2T/T. The P1T/T wave for probe #1 is illustrated in FIG. 5A.

Figure 8:
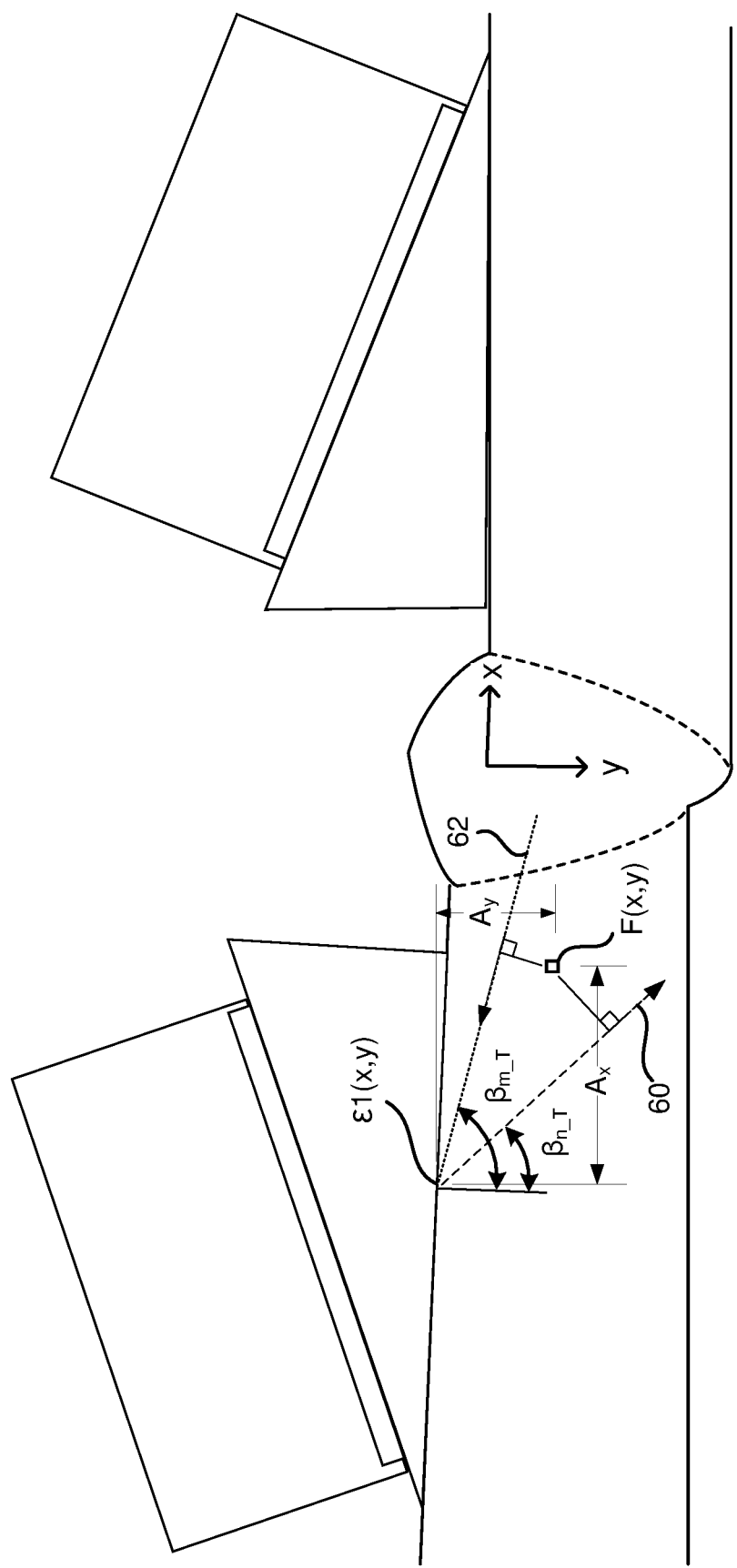
FIG. 8 is a schematic illustration of emitted and received plane waves.

The imaging volume in test object 40 is assumed to be divided into small volumes which are referred to as voxels. Each of the plane waves originates either at $\varepsilon_1$ or $\varepsilon_2$, and for an initial calculation, each plane wave is assumed to be infinitely wide. FIG. 8 illustrates a P1T/T emitted plane wave 60 and P1T/T received plane wave 62. It should be noted that the lines representing plane waves 60 and 62 in FIG. 8 are lines normal to infinitely wide wavefronts of the respective plane waves. A total round trip time of flight can be calculated relative to $\varepsilon_1$ (from probe #1) or $\varepsilon_2$ (from probe #2) for the wavefront of emitted plane wave 60 to reach the voxel at F(x,y), and then for the wavefront of received plane wave 62 to return from the voxel. The time of flight for wave 60 to reach the voxel is given by:

$$\tau_{n\_T}(x,y) = (A_y \cos \beta_{n\_T} + A_x \sin \beta_{n\_T})/c_T \quad (4)$$

where $A_x$ and $A_y$ are the coordinates of the voxel relative to $\varepsilon_1$, $\beta_{n\_T}$ is the inclination angle of transmitted plane wave 60, and $c_T$ is the shear wave sound velocity in part 40. The time for the whole round trip is calculated by adding the same formula for the wave reception:

$$\tau_{nm\_T/T}(x, y) = \frac{A_y(y) \cdot \cos(\beta_{n\_T}) + A_y(y) \cdot \cos(\beta_{m\_T}) + A_x(x) \cdot \sin(\beta_{n\_T}) + A_x(x) \cdot \sin(\beta_{m\_T})}{c_T} \quad (5)$$

Accordingly, a TFM summation at position (x,y) is possible by summing all the A-scans (defined here as AS'$_T$(n, m,t)) of the calibrated plane wave matrix FMC'$_T$(N, M) with time delays provided by equation (5).

For the first probe, the summed matrix is represented by:

$$TFM_{P1T/T}(x,y) = \Sigma_{m=1}^{M'} \Sigma_{n=1}^{N'} AS'_T(m,n,\tau_{nm\_P1TT/T}(x,y)) \quad (6)$$

For the second probe, the summed matrix is represented by:

$$TFM_{P2T/T}(x,y) = \Sigma_{m=M'+1}^{M} \Sigma_{n=N'+1}^{N} AS'_T(m,n,\tau_{nm\_P2TT/T}(x,y)) \quad (7)$$

Equations (6) and (7) represent the basic function of beam forming module 10, in which a constructive TFM matrix is obtained by summing A-scans with appropriate delays, using plane waves in both transmission and reception.

Note, however, that equations (6) and (7) do not include input from geometry module 12, and this needs to be included as described below in order to achieve fast imaging which is adaptive to geometric variations of the part and probes.

Figure 9:
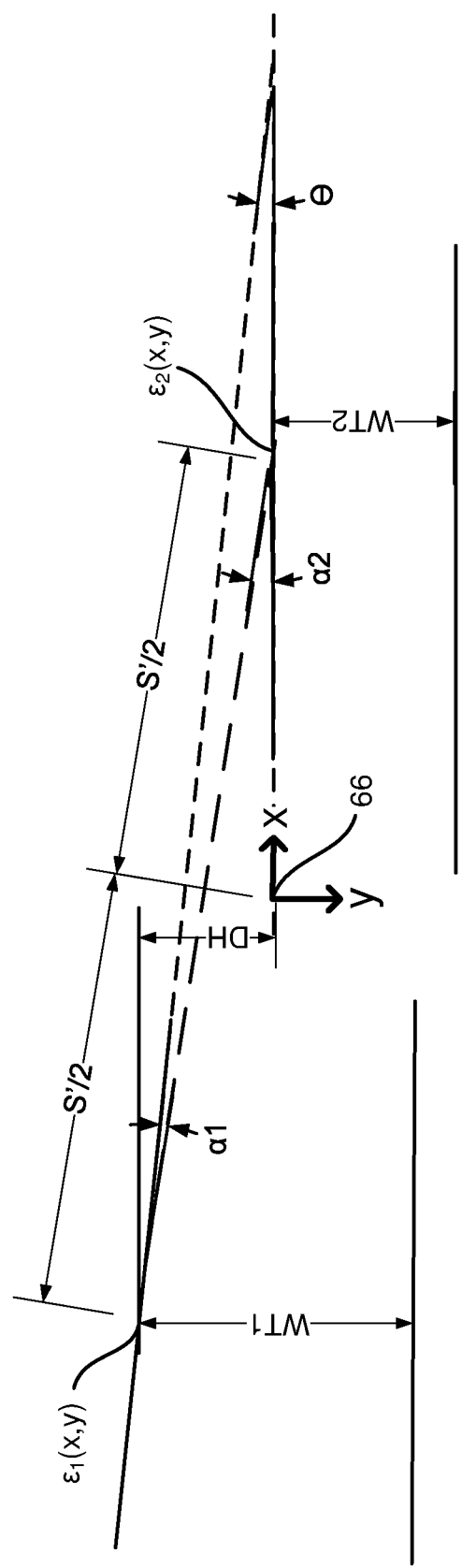
FIG. 9 is a schematic illustration defining a common reference system for two probes.

The time-of-flight expressed in equation (5) can be referred to a common reference system for both probes, which is shown in FIG. 9. The reference system has a reference system origin 66 located between $\varepsilon_1$(x,y), the origin of plane waves for probe #1, and $\varepsilon_2$(x,y), the origin of plane waves for probe #2.

Referring to FIGS. 8 and 9, the coordinates of a voxel at F(x,y) for probe #1 are given by:

$$A_{1y}(y) = y + DH \quad (8)$$

$$A_{1x}(x) = x + \frac{s' \cdot \cos(2\alpha_2)}{2 \cdot \cos(\alpha_2)} \quad (9)$$

The coordinates of a voxel at F(x,y) for probe #2 are given by:

$$A_{2y}(y) = y \quad (10)$$

$$A_{2x}(x) = x - \frac{S'}{2 \cdot \cos(\alpha 2)} \quad (11)$$

Accordingly, equation (5) can be expressed as in equations (12) to (19) below:

$$\tau_{nm\_P1T/T}(x, y, DH, \theta, S') = y \cdot \zeta_{nm\_P1T/T} + x \cdot \eta_{nm\_P1T/T} + \gamma_{nm\_P1T/T} \quad (12)$$

$$\tau_{nm\_P2T/T}(x, y, DH, \theta, S') = y \cdot \zeta_{nm\_P2T/T} + x \cdot \eta_{nm\_P2T/T} + \gamma_{nm\_P2T/T} \quad (13)$$

Where:

$$\zeta_{nm\_P1T/T}(m, n, \theta) = \frac{\cos(\beta_{n\_T1}) + \cos(\beta_{m\_T1})}{c_T} \quad (14)$$

$$\eta_{nm\_P1T/T}(m, n, \theta) = \frac{\sin(\beta_{n\_T1}) + \sin(\beta_{m\_T1})}{c_T} \quad (15)$$

$$\gamma_{nm\_P1T/T}(m, n, \theta, DH, S') = DH \cdot \zeta_{nm\_\frac{P1T}{T}} + \frac{s' \cdot \cos(2\alpha_2)}{2 \cdot \cos(\alpha_2)} \cdot \eta_{nm\_P1T/T} \quad (16)$$

$$\zeta_{nm\_P2T/T}(m, n) = \frac{\cos(\beta_{n\_T2}) + \cos(\beta_{m\_T2})}{c_T} \quad (17)$$

$$\eta_{nm\_P2T/T}(m, n) = \frac{\sin(\beta_{n\_T2}) + \sin(\beta_{m\_T2})}{c_T} \quad (18)$$

$$\gamma_{nm\_P2T/T}(m, n, S') = -\frac{S'}{2 \cdot \cos\alpha_2} \cdot \eta_{nm\_P2T/T} \quad (19)$$

Note that the formulations of equations (12) to (19) involve a minimum amount of calculation for changes of $\theta$, DH and S', because the parameters $\zeta$, $\eta$ and $\gamma$ are calculated only once for each probe scan position and for each element of the FMC'(n,m) matrix. When deriving an image I(x,y), the position coordinates x and y are the only variables for each probe scan position. This is an important and novel aspect of the present disclosure, representing a major reduction in the image acquisition time, electronic processing and memory requirements relative to existing practice.

Until now, the formulations have been applied only to the P1T/T and P2T/T modes. However, a very general formulation of equation (5) can be made for any combination of modes such as those illustrated in FIGS. 5A and 5B:

$$\tau_{nm} = \tau_n + \tau_m \quad (20)$$

where $\tau_n$ is the plane wave time of flight in transmission and $\tau_m$ is the plane wave time of flight in reception.
The times of flight for all propagation modes are then given by:

$$\tau_{n\_T}(x,y) = (A_y \cos\beta_{n\_T} + A_x \sin\beta_{n\_T})/c_T \quad (21)$$

$$\tau_{n\_TT}(x,y) = ((2 \cdot WT - A_y)\cos\beta_{n\_T} + A_x \sin\beta_{n\_T})/c_T \quad (22)$$

$$\tau_{n\_L}(x,y) = (A_y \cos\beta_{n\_L} + A_x \sin\beta_{n\_L})/c_L \quad (23)$$

$$\tau_{n\_LL}(x,y) = ((2 \cdot WT - A_y)\cos\beta_{n\_L} + A_x \sin\beta_{n\_L})/c_L \quad (24)$$

where, as before, T refers to a shear wave without skip, TT a shear wave with skip, L refers to a longitudinal wave without skip, LL a longitudinal wave with skip, WT is the wall thickness of the section of part 40 in which skip occurs, and n refers to plane waves in transmission. Note that equations for plane waves in reception may be obtained directly from equations (21) to (24) by replacing "n" with "m".

By using equation (20) to combine the appropriate transmission and reception modes from equations (21) to (24) and then applying the transformations of equations (8) to (11) corresponding to the proper probe selection, any of the imaging modes can be expressed in the format of equations (12) and (13). Accordingly, multi-mode adaptive imaging can be achieved by calculating the $\zeta$, $\eta$ and $\gamma$ only once for each probe scan position, for each imaging mode and for each element of the FMC'(n,m) matrix.

Imaging Module

The TFM matrices of equations (6) and (7) are representative of the ultrasound signal intensity in a plane perpendicular to the probe scanning direction, and such matrices may be used by imaging module 14 to form intensity or color images using methods which are well known in the art. However, an optional and novel function of imaging module 14 is to apply a compensation for the finite extent of each plane wave as described below.

Figure 10:
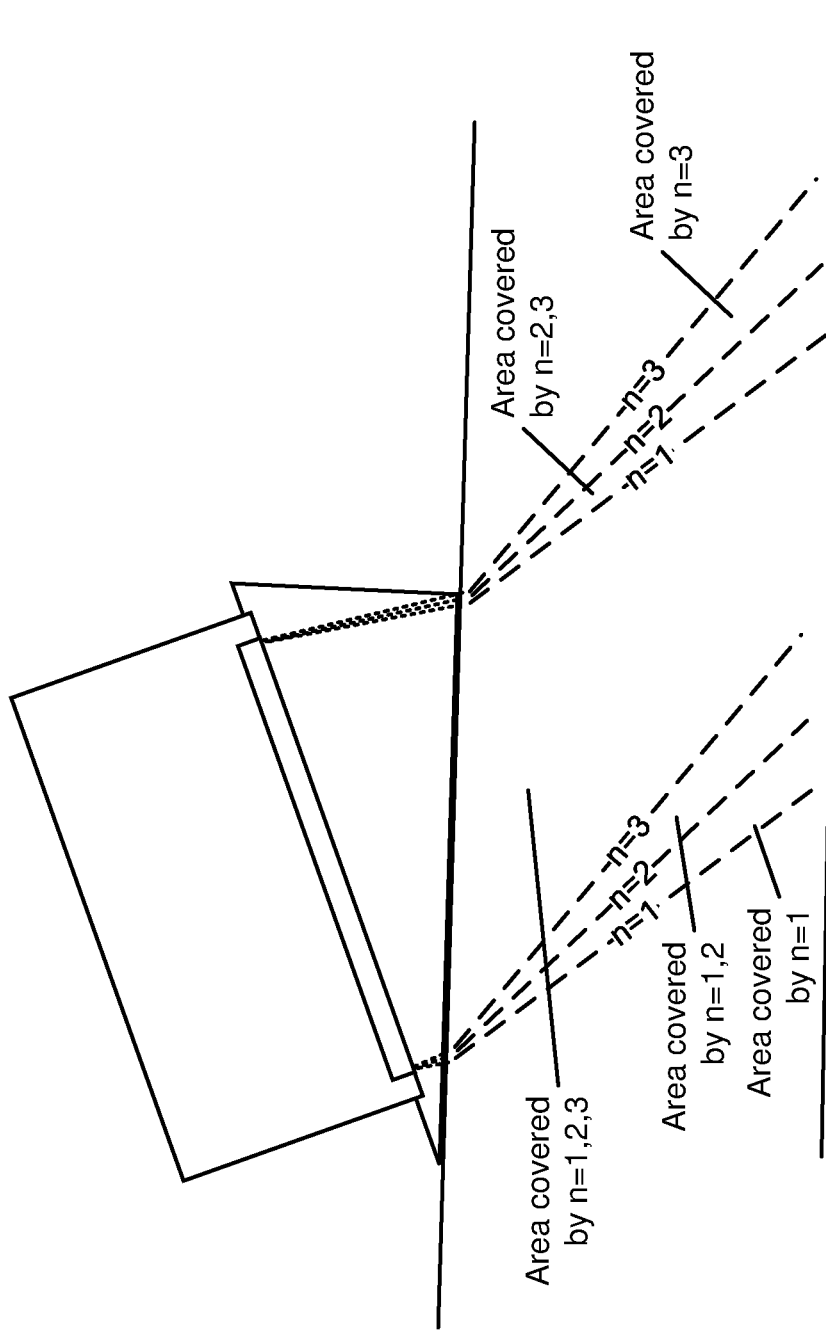
FIG. 10 is an illustration of the area covered by a set of 3 plane waves.

Since each plane wave is generated from a probe of finite length, the plane waves themselves cover only a portion of the inspected area. This is illustrated in FIG. 10 for a set of 3 transmitted plane waves designated n=1, n=2 and n=3.

As an optional embodiment of this disclosure, effects due to the finite extent of the plane waves are normalized so as to obtain an amplitude response from an omnidirectional reflector which is substantially independent of the number of plane waves that cover a given area on the reflector. Whereas this feature is optional, it does enable adaptive compensation of the signal amplitude during the scan.

Figure 11:
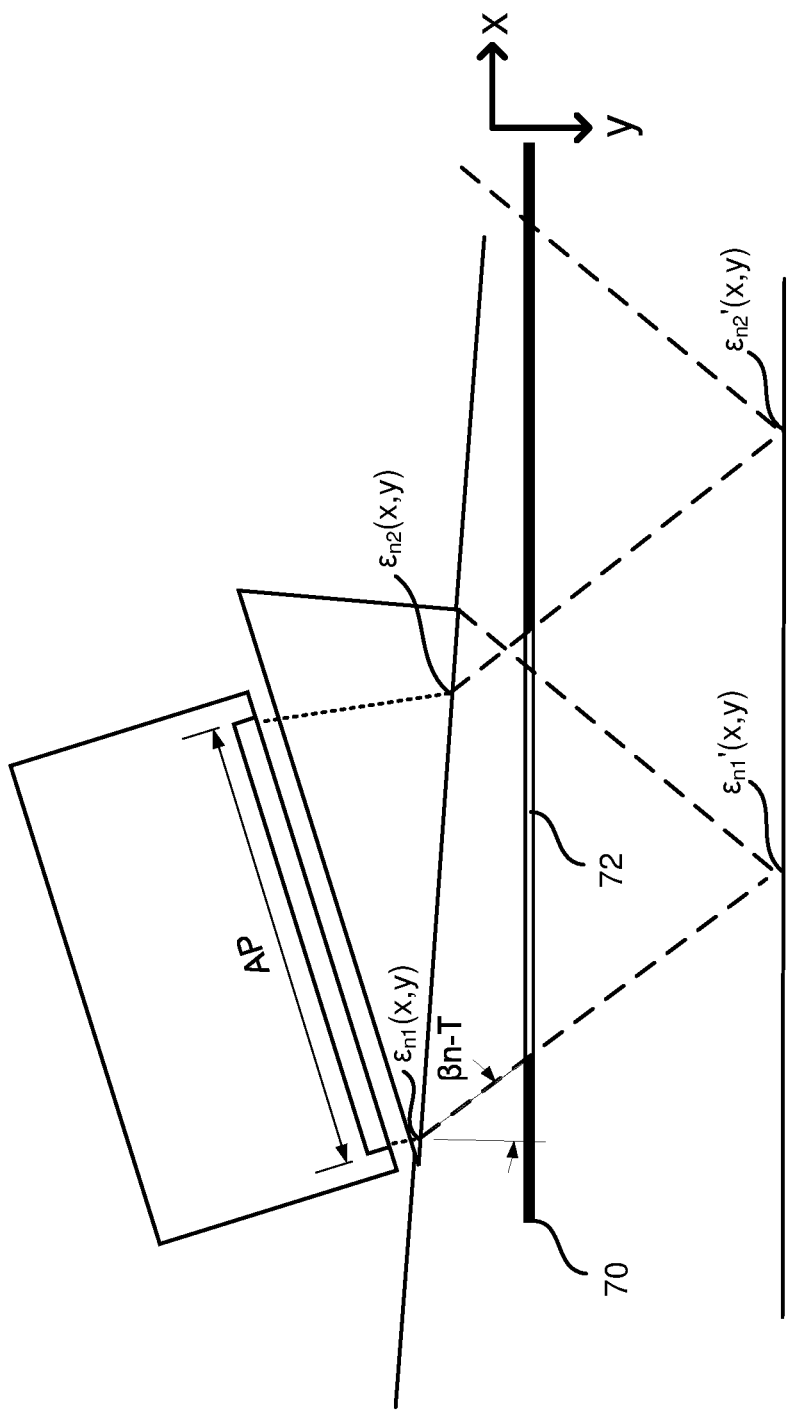
FIG. 11 is an illustration of the transmitted wave coverage of a single line for the T wave propagation mode.

FIG. 11 is an illustration of the transmitted wave coverage of a single line 70 for the T wave propagation mode. If the limits of the probe aperture AP, namely $\varepsilon_{n1}(x,y)$, $\varepsilon_{n2}(x,y)$, $\varepsilon_{n1}'(x,y)$ and $\varepsilon_{n2}'(x,y)$ are defined and localized at fixed known positions (by probe and wedge design) relative to the previously described wave exit points $\varepsilon_1$ or $\varepsilon_2$ (and therefore to the reference system x/y of FIG. 9), a coverage matrix corresponding to the imaging area, having resolution and size matching the voxels in the imaging area, can be built for each of the n and m waves in T, TT, L or LL wave propagation mode. Each coverage matrix defines a coverage factor which is 0 if the position (x,y) is outside the coverage of the corresponding wave propagation mode, and which is 1 if the position (x,y) is within the coverage. Applying this concept to FIG. 11, it is seen that the coverage factor for the illustrated n-T plane wave is equal to 1 in the covered region 72 of line 70, and is equal to 0 at all other positions on line 70.

Generalizing the concept, a coverage matrix A may be constructed for each of the N transmitted and M received plane waves and for each of the wave propagation paths, wherein each matrix contains a coverage factor for each of the (x,y) positions. The coverage factor is either 0 or 1, depending on whether that position is outside or within coverage respectively.

$$A_{n\_T}(x,y) = [0,1] \quad (25a)$$

$$A_{n\_TT}(x,y) = [0,1] \quad (25b)$$

$$A_{m\_T}(x,y) = [0,1] \quad (25c)$$

$$A_{m\_TT}(x,y) = [0,1] \quad (25d)$$

$$A_{n\_L}(x,y) = [0,1] \quad (25e)$$

$$A_{n\_LL}(x,y) = [0,1] \quad (25f)$$

$$A_{m\_L}(x,y) = [0,1] \quad (25g)$$

$$A_{m\_LL}(x,y) = [0,1] \quad (25h)$$

Also included in the factors of equations (25a) to (25h) are the limits of the beam with respect to known front and back wall positions (i.e. the coverage factor will be set to 0 when outside the part).

Mode specific compensation factors X(x,y) can then be determined for all positions within the imaging plane:

$$X_{T/T}(x,y)=1/\Sigma_{m=1}^{M}\Sigma_{n=1}^{N}\Lambda_{n\_T}\cdot\Lambda_{m\_T} \quad (26a)$$

$$X_{TT/TT}(x,y)=1/\Sigma_{m=1}^{M}\Sigma_{n=1}^{N}\Lambda_{n\_TT}\cdot\Lambda_{m\_TT} \quad (26b)$$

$$X_{TT/T}(x,y)=1/\Sigma_{m=1}^{M}\Sigma_{n=1}^{N}\Lambda_{n\_TT}\cdot\Lambda_{m\_T} \quad (26c)$$

$$X_{P1L/P2L}(x,y)=1/\Sigma_{m=1}^{M}\Sigma_{n=1}^{N}\Lambda_{n\_L}\cdot\Lambda_{m\_L} \quad (26d)$$

$$X_{P1LL/P2LL}(x,y)=1/\Sigma_{m=1}^{M}\Sigma_{n=1}^{N}\Lambda_{n\_LL}\cdot\Lambda_{m\_LL} \quad (26e)$$

Note that the smaller the coverage A for a particular position (x,y), the larger the required compensation factor X. Above a certain arbitrary limit of compensation factor X, the coverage is considered inadequate for inspection and no data is processed at this (x,y) position (empty voxel).

Compensation factors X can be applied to the image to provide an adaptive compensation of the beam coverage (adaptively compensated TFM'). For example starting from equation (6).

$$TFM'_{P1T/T}(x,y)=TFM_{P1T/T}(x,y)\cdot X_{T/T}(x,y) \quad (27)$$

The signal amplitude TFM'(x,y) is then translated into an image of intensity I(x,y) using conventional imaging methods.

It should be noted that the image I(x,y) dynamically adapts to variations in the actual geometry of the part under inspection. For example, if a scan is performed along the length of a weld, the inspection result will consist of a series of images, all of which are correctly adapted to the actual part geometry at each scan position. Imaging errors common in existing practice are thereby eliminated by means of a rapid adaptive scan. This is a novel and important feature of the present disclosure.

Although the present invention has been described in relation to particular embodiments thereof, it can be appreciated that various designs can be conceived based on the teachings of the present disclosure, and all are within the scope of the present disclosure.

What is claimed is:

1. A phased array ultrasound (PAUT) imaging system comprising:
   at least one PAUT probe configured to be coupled with a test object, the at least one probe having an array of ultrasound transducers for transmitting ultrasound energy and receiving response energy;
   a plane wave generating unit configured to transmit a series of electronic pulses to the at least one probe, the series of electronic pulses configured to cause emission of a number N of transmitted plane waves from the array of ultrasound transducers;
   a plane wave receiving unit configured to receive response signals responsive to possible flaws in the test object, wherein the response signals from each of the transmitted plane waves are received as a number M of received plane waves, wherein the response signals from corresponding transmitted plane waves and received plane waves are combined in a plane wave full matrix capture (FMC) matrix, which has a matrix dimension (N×M); and,
   a plane wave processing module configured to process the plane wave FMC matrix and to produce an image of the flaws in an imaging volume within the test object,
   wherein the plane wave processing module further comprises a calibration module for performing a calibration of the plane wave FMC matrix to produce a calibrated plane wave FMC matrix in which an amplitude of the response signals from any selected flaw is substantially the same for any location of the selected flaw within the imaging volume.

2. The phased array ultrasound imaging system of claim 1 wherein an $n^{th}$ transmitted wave of the N transmitted plane waves has an inclination angle $\beta_n$ and an $m^{th}$ received wave of the M received plane waves has an inclination angle $\beta_m$, wherein n=1 to N and m=1 to M.

3. The phased array ultrasound imaging system of claim 1 wherein the calibration is based on analytic calculations of plane wave transmission and reflection coefficients.

4. The phased array ultrasound imaging system of claim 1 wherein the response signals for each N transmitted plane wave are received by Z elements generating Z digital waveforms for each N transmitted plane wave and the Z digital waveforms are summed to generate respective ones of the M received plane waves.

5. The phased array ultrasound imaging system of claim 1 wherein the plane wave processing module further comprises a geometry module configured to determine geometric parameters of the test object and the at least one probe, the geometric parameters comprising at least one thickness measurement of the test object, a location of the at least one probe and an orientation angle of the at least one probe.

6. The phased array ultrasound imaging system of claim 5 wherein the at least one probe is mechanically moved in a scan direction on a surface of the test object thereby having a sequence of probe scan positions, wherein the imaging volume is substantially in a plane perpendicular to the scan direction, a voxel within the imaging volume has coordinates (x,y) and the imaging volume comprises a multiplicity of adjacent voxels.

7. The phased array ultrasound imaging system of claim 6 wherein the plane wave processing module further comprises an adaptive beam forming module receiving input from the calibration module and the geometry module, and producing a plane wave total focusing method (TFM) matrix, TFM(x,y), in which a summation is made of the response signals in the plane wave FMC matrix for each of the multiplicity of voxels.

8. The phased array ultrasound imaging system of claim 7 wherein the summation includes a response signal time delay for the each of the multiplicity of voxels, wherein the time delay is equal to a sum of a transmit time of flight and a receive time of flight, and wherein the transmit time of flight is the time for the transmitted plane wave to reach the voxel and the receive time of flight is the time for the received plane wave to return from the voxel.

9. The phased array ultrasound imaging system of claim 7 wherein the plane wave processing module further comprises an imaging module for forming an image of the flaws in the imaging volume, the imaging module receiving input from the plane wave TFM matrix.

10. The phased array ultrasound imaging system of claim 9 wherein the image is an adaptive image which is corrected in response to a change of at least one of the geometric parameters.

11. The phased array ultrasound imaging system of claim 10 wherein the adaptive image corresponding to each one of the sequence of the probe scan positions is derived using equations in which the coordinates (x,y) are the only variables for each one of the sequence of the probe scan positions.

12. An ultrasonic imaging method for imaging flaws in a test object comprising the steps of:
   placing at least one phased array ultrasound (PAUT) probe in contact with the test object, the at least one probe having an array of ultrasound transducers for transmitting ultrasound energy and receiving response energy;

transmitting a series of electronic pulses to the at least one probe, the series of electronic pulses configured to cause emission of transmitted plane waves from the array of ultrasound transducers;

receiving response signals responsive to possible flaws in the test object, wherein the response signals from each of the transmitted plane waves are received as received plane waves, and wherein the response signals from corresponding transmitted plane waves and received plane waves are combined in a plane wave full matrix capture (FMC) matrix;

processing the plane wave FMC matrix to produce an image of the flaws in an imaging volume within the test object; and calibrating the plane wave FMC matrix to produce a calibrated plane wave FMC matrix, in which an amplitude of the response signal from any selected flaw is substantially the same for any location of the selected flaw within the imaging volume.

13. The ultrasonic imaging method of claim 12 wherein the response signals for each transmitted plane wave are received by a plurality of elements generating a plurality of digital waveforms for each transmitted plane wave and the plurality of digital waveforms are summed to generate a received plane wave.

14. The ultrasonic imaging method of claim 12 further comprising a step of producing a calibrated plane wave total focusing method (TFM) matrix, in which a summation is made of the response signals in the plane wave FMC matrix.

15. The ultrasonic imaging method of claim 14 wherein the summation includes a response signal time delay for each of the response signals.

16. The ultrasonic imaging method of claim 15 further comprising a step of using data from the calibrated plane wave TFM matrix to form an image of the flaws in the imaging volume.

17. The ultrasonic imaging method of claim 16 further comprising a step of determining geometric parameters of the test object and the at least one probe, the geometric parameters comprising at least one thickness measurement of the test object, a location of the at least one probe and an orientation angle of the at least one probe.

18. The ultrasonic imaging method of claim 17, wherein the image is an adaptive image which is corrected in response to a change of at least one of the geometric parameters.

19. The ultrasonic imaging method of claim 18 further comprising a step of mechanically moving the at least one probe in a scan direction on a surface of the test object, thereby having a sequence of probe scan positions, wherein the imaging volume is substantially in a plane perpendicular to the scan direction, a voxel within the imaging volume has coordinates (x,y), and wherein the adaptive image corresponding to each one of the sequence of probe scan positions is derived using equations in which the coordinates (x,y) are the only variables for each one of the sequence of probe scan positions.

20. A phased array ultrasound (PAUT) imaging system comprising:

at least one PAUT array probe configured to be coupled with and to test a test object, each one of the at least one probe having an array of ultrasound transducers, the array comprising P transmitters for transmitting ultrasound energy and Q receivers for receiving response energy;

a plane wave forming module configured to transmit electronic pulses to the at least one probe, to receive response signals responsive to possible flaws in the test object and to form a plane wave full matrix capture (FMC) matrix, the plane wave FMC matrix being a N×M matrix of N transmitted plane waves and M received plane waves; and, a plane wave processing module configured to process the plane wave FMC matrix and to produce an image of the flaws in an imaging volume in the test object, wherein the plane wave processing module further comprises a calibration module for performing a calibration of the plane wave FMC matrix to produce a calibrated plane wave FMC matrix in which an amplitude of the response signals from any selected flaw is substantially the same for any location of the selected flaw within the imaging volume.

21. The phased array ultrasound (PAUT) imaging system of claim 20 wherein the plane wave forming module further comprises:

a FMC acquisition unit configured to transmit the electronic pulses, the electronic pulses configured to cause each of the P transmitters to individually transmit ultrasound energy, and the FMC acquisition unit further configured to receive the response signals from each of the Q receivers, thereby forming a FMC matrix of the P×Q response signals; and, a plane wave calculation unit configured to calculate the plane wave FMC matrix from the FMC matrix, the plane wave FMC matrix being equivalent to transmission of the N transmitted plane waves and reception of the M received plane waves.

22. The phased array ultrasound (PAUT) imaging system of claim 20 wherein and the plane wave forming module further comprises:

a plane wave generating unit configured to transmit the electronic pulses, the electronic pulses configured to cause emission of the N transmitted plane waves from the P transmitters;

a plane wave receiving unit configured to receive the response signals, wherein the response signals from each of the N transmitted plane waves are received as the M received plane waves, and wherein the response signals from corresponding transmitted plane waves and received plane waves are combined to form the plane wave FMC matrix.

23. The phased array ultrasound (PAUT) imaging system of claim 20 wherein the response signals for each N transmitted plane wave are received by Z elements generating Z digital waveforms for each N transmitted plane wave and the Z digital waveforms are summed to generate respective ones of the M received plane waves.

* * * * *